Figure 1:
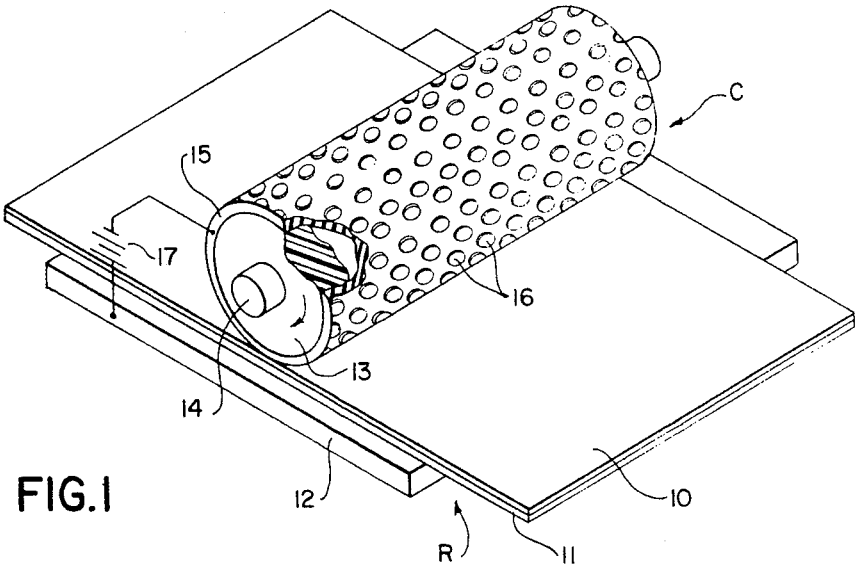
Figure 2:
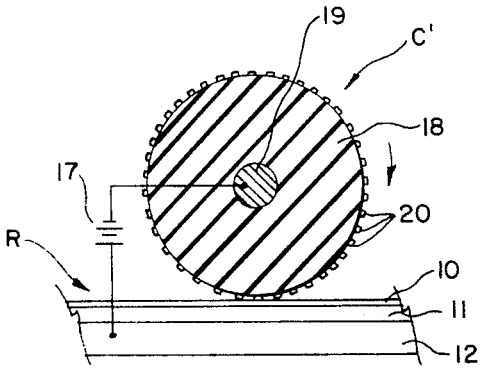
Figure 3:
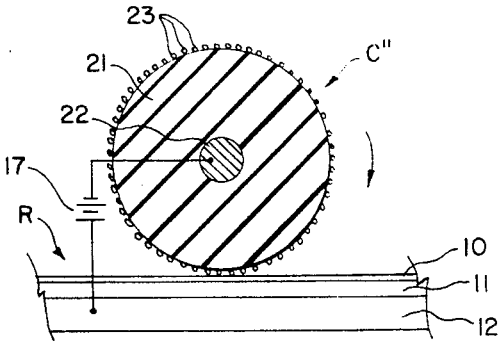

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 30, 1970

875 O.G. 713

T875,026
CHARGING APPARATUS
Philip Thompson Scharf, 901 Elmgrove Road,
Pittsford, N.Y. 14650
Filed Oct. 30, 1969, Ser. No. 872,573
Int. Cl. G03g *13/00*
U.S. Cl. 250—49.5
1 Sheet Drawing. 7 Pages Specification

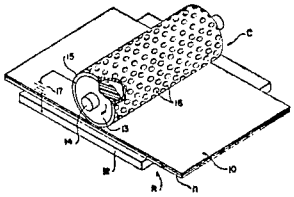

An apparatus is provided for induction charging of a receiver having a photoconductive surface. Proper spacing between the photoconductive surface of the receiver and the conductive surface of a charging roller is obtained in one embodiment by providing a photoresist insulative dot pattern on the conductive surface of the roller. Air ionization takes place in the spacing during application of a potential between the conductive surface of the charging roller and a conductive backing on the receiver. In another embodiment the proper spacing is provided by an insulative powder which is sprinkled or dusted onto the conductive surface prior to use.

June 30, 1970 P. T. SCHARF T875,026

CHARGING APPARATUS

Filed Oct. 30, 1969

PHILIP T. SCHARF

INVENTOR.

BY Gary D. Fields

Robert W Hampton

ATTORNEYS